United States Patent
Ryskoski et al.

(10) Patent No.: US 7,277,824 B1
(45) Date of Patent: Oct. 2, 2007

(54) METHOD AND APPARATUS FOR CLASSIFYING FAULTS BASED ON WAFER STATE DATA AND SENSOR TOOL TRACE DATA

(75) Inventors: Matthew S. Ryskoski, Kyle, TX (US); Kevin R. Lensing, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/180,393

(22) Filed: Jul. 13, 2005

(51) Int. Cl.
*G01B 5/28* (2006.01)

(52) U.S. Cl. .................... 702/185; 702/35; 702/105; 714/724; 700/110; 700/121; 700/266

(58) Field of Classification Search ............... 702/35, 702/105, 185; 700/110, 121, 126; 714/724
See application file for complete search history.

(56) References Cited

U.S. PATENT DOCUMENTS

| | | | |
|---|---|---|---|
| 6,192,287 B1* | 2/2001 | Solomon et al. ............ 700/110 |
| 6,563,300 B1* | 5/2003 | Jackson et al. ........... 324/158.1 |
| 6,725,402 B1* | 4/2004 | Coss et al. .................... 714/48 |
| 6,766,258 B1* | 7/2004 | Stewart et al. ................ 702/35 |
| 6,850,811 B1* | 2/2005 | Stewart ...................... 700/110 |
| 7,051,250 B1* | 5/2006 | Allen et al. ................. 714/708 |
| 2004/0243256 A1* | 12/2004 | Willis et al. ................... 700/21 |
| 2005/0021272 A1* | 1/2005 | Jenkins et al. .............. 702/105 |
| 2005/0047645 A1* | 3/2005 | Funk et al. ................. 382/145 |
| 2005/0171627 A1* | 8/2005 | Funk et al. ................. 700/121 |
| 2006/0184264 A1* | 8/2006 | Willis et al. ................ 700/108 |

\* cited by examiner

*Primary Examiner*—Carol S. W. Tsai
(74) *Attorney, Agent, or Firm*—Morgan Williams; P. C. Amerson

(57) ABSTRACT

The present invention provides a method and apparatus for classifying faults. The method includes accessing wafer state data associated with at least one wafer processed by at least one processing tool and sensor tool trace data associated with the at least one processing tool and determining that at least one fault occurred based upon at least one of the wafer state data and the sensor tool trace data. The method also includes selecting, in response to determining that the at least one fault occurred, a subset of a plurality of faults based upon at least one of the wafer state data and the sensor tool trace data and selecting at least one fault from the subset of the plurality of faults based upon at least one of the wafer state data and the sensor tool trace data.

7 Claims, 6 Drawing Sheets

METHOD AND APPARATUS FOR CLASSIFYING FAULTS BASED ON WAFER STATE DATA AND SENSOR TOOL TRACE DATA

BACKGROUND OF THE INVENTION

1. Field of the Invention

This invention relates generally to the field of semiconductor device manufacturing and, more particularly, to a method and apparatus for classifying faults based on wafer state data and sensor tool trace data.

2. Description of the Related Art

To fabricate a semiconductor device, a wafer is typically processed in numerous processing tools in a predetermined sequence. The processing tools may include photolithography steppers, etch tools, deposition tools, polishing tools, rapid thermal processing tools, implantation tools, and the like. Each processing tool modifies the wafer according to a particular operating recipe. For example, a photolithography stepper may be used to form a patterned layer of photoresist above the wafer. Features in the patterned layer of photoresist correspond to a plurality of features, e.g. gate electrode structures, which will ultimately be formed above the surface of the wafer. The tool sequence, as well as the recipes used by the tools, must be carefully controlled so that the features formed on the wafer meet appropriate design and performance criteria. Thus, advanced process control (APC) systems are often used to coordinate operation of the processing tools.

A conventional APC system includes one or more machine interfaces that are communicatively coupled to equipment interfaces associated with each of the processing tools. The machine and equipment interfaces are typically computers or workstations that are coupled to a network. For example, a plurality of processing tools may be coupled to an Intranet via an associated plurality of equipment interfaces. A machine interface that implements the conventional APC system may also be coupled to the Intranet. In operation, the conventional APC system initiates a control script based upon a manufacturing model, which can be a software program that automatically retrieves the data needed to execute a manufacturing process, and transmits one or more control messages, such as the operating recipe, to the processing tools.

The processing tools typically include one or more sensors to collect data associated with operation of the processing tool. For example, an etching tool may include a sensor to monitor the radio frequency power delivered by the etching tool. For another example, a rapid thermal anneal tool may include a thermocouple to monitor a temperature within the tool. The data acquired by the various sensors may be referred to as tool trace data. The collected tool trace data may then be provided to the APC system, which may use the collected tool trace data for various purposes such as fault detection and/or classification. For example, the tool trace data collected by the thermocouple in the rapid thermal anneal tool may indicate that the temperature within the tool has dropped below a desired threshold, indicating a possible fault.

Wafer state data indicative of the physical state of one or more wafers may also be collected by various devices within the APC system. For example, one or more metrology tools may be used to perform ex situ measurements on selected wafers after they have been processed by one or more processing tools. The ex situ measurements may include measurements of a thickness of a layer of material formed on the wafer, a critical dimension (CD) of one or more features formed on the wafer, and the like. One or more in situ measurements may also be performed by devices incorporated within a processing tool. The in situ measurements may include measurements of a temperature of the wafer, a thickness of a layer formed on the wafer, a critical dimension of one or more features formed on the wafer, or other characteristic parameters that may be measured while the wafer is within the processing tool. The collected wafer state data may then be provided to the APC system, which may use the collected wafer state data to detect faults associated with the processing. For example, the wafer state data collected by an ex situ metrology tool may indicate that a mean critical dimension of one or more features exceeds a desired threshold value for the mean critical dimension, indicating a possible fault.

However, conventional APC systems treat the sensor tool trace data and the wafer state data as independent data sets. This approach may limit the ability of conventional APC systems to diagnose and/or classify faults that may occur in one or more processing tools. For example, a fault such as an unexpected change in a gas flow rate or a temperature in an etching tool may increase the mean critical dimension of the one or more features formed on the wafers in a wafer lot processed in the etching tool. Thus, information indicative of the fault may be present in both the sensor tool trace data set and the wafer state data set. However, the ability of the conventional APC system to detect and/or classify this fault may be limited by the system's inability to associate the relevant portions of the sensor tool trace data set and the wafer state data set.

The present invention is directed to addressing the effects of one or more of the problems set forth above.

SUMMARY OF THE INVENTION

In one embodiment of the present invention, a method is provided for classifying faults. The method includes accessing wafer state data associated with at least one wafer processed by at least one processing tool and sensor tool trace data associated with the at least one processing tool and determining that at least one fault occurred based upon at least one of the wafer state data and the sensor tool trace data. The method also includes selecting, in response to determining that the at least one fault occurred, a subset of a plurality of faults based upon at least one of the wafer state data and the sensor tool trace data and selecting at least one fault from the subset of the plurality of faults based upon at least one of the wafer state data and the sensor tool trace data.

In another embodiment of the present invention, a method is provided for classifying faults. The method includes determining whether wafer state data associated with at least one wafer processed by at least one processing tool is within an allowable range and selecting, in response to determining that the wafer state data is not within the allowable range, a subset of a plurality of faults based on sensor tool trace data associated with the at least one processing tool. The method also includes selecting at least one fault from the subset of the plurality of faults based on the wafer state data. In alternative embodiments of the present invention, an apparatus and a manufacturing system for classifying faults according to the above method are also provided.

In yet another embodiment of the present invention, a method is provided for classifying faults. The method includes determining whether sensor tool trace data associated with at least one processing tool is indicative of at least one fault and selecting, in response to determining that the sensor tool trace data is indicative of at least one fault, a subset of a plurality of faults based on wafer state data associated with at least one wafer processed by the at least one processing tool. The method also includes selecting at least one fault from the subset of the plurality of faults based on the sensor tool trace data. In alternative embodiments of the present invention, an apparatus and a manufacturing system for classifying faults according to the above method are also provided.

BRIEF DESCRIPTION OF THE DRAWINGS

The invention may be understood by reference to the following description taken in conjunction with the accompanying drawings, in which like reference numerals identify like elements, and in which.

Figure 1:
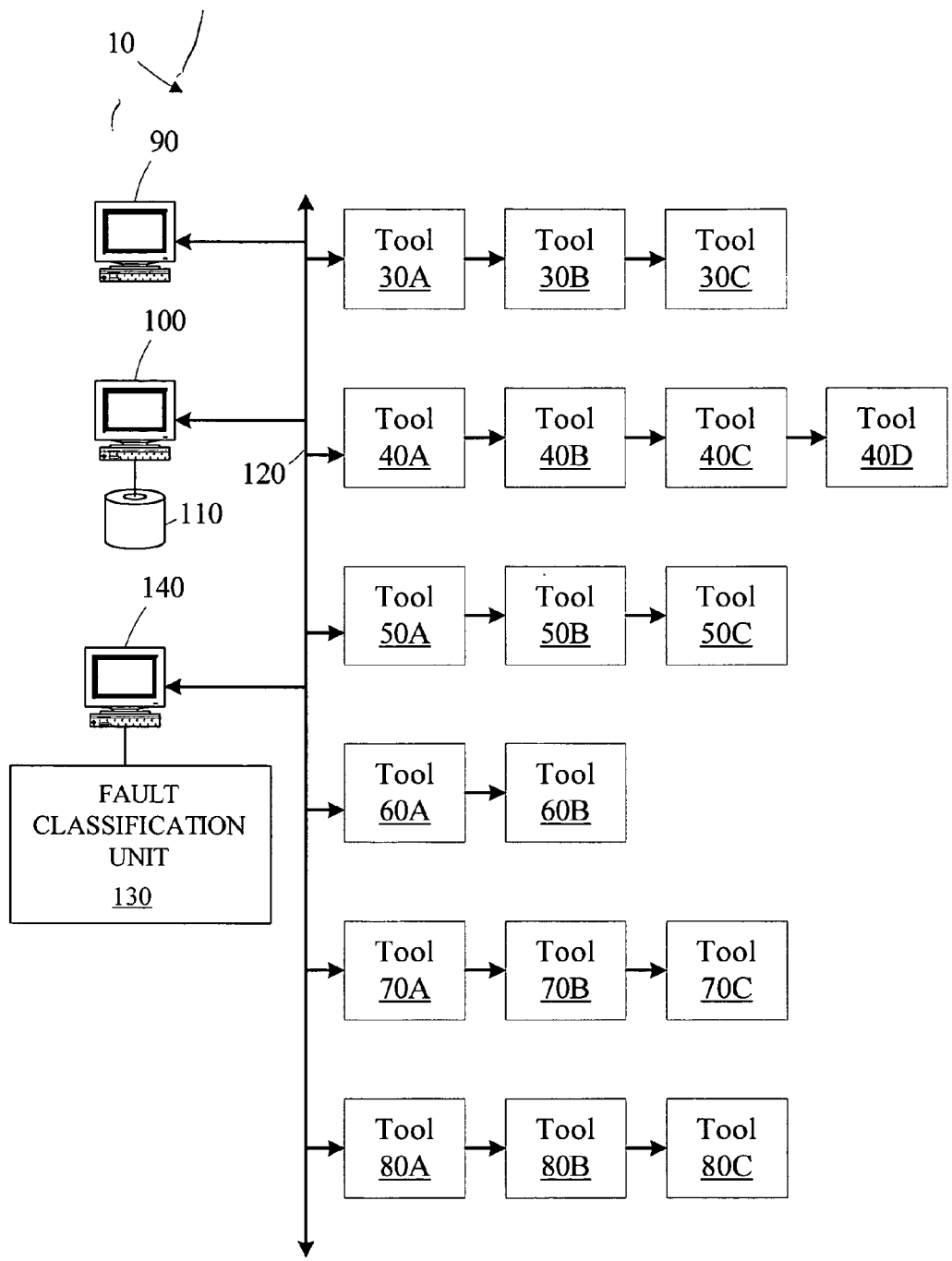
FIG. 1 is a simplified block diagram of a manufacturing system, in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

FIG. 1 shows a simplified block diagram of an illustrative manufacturing system 10. In the illustrated embodiment, the manufacturing system 10 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other similar devices. The techniques may also be applied to workpieces or manufactured items other than semiconductor devices.

An exemplary information exchange and process control framework suitable for use in the manufacturing system 10 is an Advanced Process Control (APC) framework, such as may be implemented using the Catalyst system formerly offered by KLA-Tencor, Inc. The Catalyst system uses Semiconductor Equipment and Materials International (SEMI) Computer Integrated Manufacturing (CIM) Framework compliant system technologies and is based the Advanced Process Control (APC) Framework. CIM (SEMI E81-0699—Provisional Specification for CIM Framework Domain Architecture) and APC (SEMI E93-0999—Provisional Specification for CIM Framework Advanced Process Control Component) specifications are publicly available from SEMI, which is headquartered in Mountain View, Calif. However, persons of ordinary skill in the art should appreciate that the present invention is not limited to the Catalyst APC system. In alternative embodiments, any desirable information exchange and process control framework may be used without departing from the scope of the present invention.

The manufacturing system 10 includes a plurality of tools 30-80. The tools 30-80 are grouped into sets of like tools, as denoted by lettered suffixes. For example, the set of tools 30A-30C represent tools of a certain type, such as a chemical mechanical planarization tool. A particular wafer or lot of wafers progresses through the tools 30-80 as it is being manufactured, with each tool 30-80 performing a specific function in the process flow. Exemplary processing tools for a semiconductor device fabrication environment include metrology tools, photolithography steppers, etch tools, deposition tools, polishing tools, rapid thermal processing tools, implantation tools, and the like The tools 30-80 are depicted in a rank and file grouping for illustrative purposes only. In an actual implementation, the tools 30-80 may be arranged in any physical order or grouping.

A manufacturing execution system (MES) server 90 directs high level operation of the manufacturing system 10. The MES server 90 monitors the status of the various entities in the manufacturing system 10 (i.e., wafer lots, tools 30-80) and controls the flow of articles of manufacture (e.g., lots of semiconductor wafers) through the process flow. A database server 100 is provided for storing data related to the status of the various entities and articles of manufacture in the process flow. The database server 100 may store information in one or more data stores 110. The data may include pre-process and post-process metrology data, tool states, lot priorities, and the like. The processing and data storage functions are distributed amongst the different computers or workstations in FIG. 1 to provide general independence and central information storage. However, persons of ordinary skill in the art should appreciate that different numbers of computers and different arrangements may be used without departing from the scope of the instant invention.

A network 120 interconnects various components of the manufacturing system 10, such as the tools 30-80 and the servers 90, 100, allowing them to exchange information. In one embodiment, each of the tools 30-80 is coupled to a computer (not shown) for interfacing with the network 120. Additionally, the connections between the tools 30-80 in a particular grouping are meant to represent connections to the network 120, rather than interconnections between the tools 30-80. In various alternative embodiments, the network 120 may be an Internet, intranet, or any other desirable type of network. Persons of ordinary skill in the art should appreciate that the network 120 may include a variety of routers, hubs, switches, connectors, interfaces, cables, wires, and the like that are not shown in FIG. 1.

A fault classification unit 130 is coupled to the network 120. In the illustrated embodiment, the fault classification unit 130 is implemented in a computer 140, which may be coupled to the network 120 in any desirable manner. As will be discussed in detail below, the fault classification unit 130 receives wafer state data from one or more of the tools 30-80 or from the database server 110. The term "wafer state data" will be used herein, in accordance with common usage in the art, to refer to data indicative of the physical state of one or more wafers. Examples of wafer state data include, but are not limited to, a wafer temperature, critical dimensions of one or more features (not shown) on a wafer surface, a thickness of a layer formed on or above a surface of the wafer, a slope of a surface of the layer formed on or above the wafer, and data indicative of one or more patterns of features formed on or above the surface of the wafer.

The fault classification unit 130 also receives sensor tool trace data from one or more of the tools 30-80 and/or the database server 110. The term "sensor tool trace data" will be used herein, in accordance with common usage in the art, to refer to data associated with one or more of the tools 30-80. For example, sensor tool trace data may include information indicative of a state of one or more tools 30-80, such as an idle state and/or an active state in which the tool 30-80 is processing one or more wafer lots. For another example, the sensor tool trace data may include information indicative of environmental conditions that may be experienced by one or more wafers while inside one or more of the tools 30-80, such as a gas pressure, a gas flow rate, an ambient temperature, a radiofrequency (RF) power, an ion deposition energy, an ion flux, and the like. Although the environmental conditions may impact the physical state of the wafer, they are associated with the tool and not the wafer, which may or may not be present in the tool at the time the environmental conditions are determined, and therefore measurements of these quantities are considered tool trace data.

During and/or after processing one or more wafers in one or more of the processing tools 30-80, the fault classification unit 130 may determine that the wafer state data associated with at least one of the wafers is outside of an allowable range, indicating a potential fault condition. For example, the fault classification unit 130 may determine that the temperature of one of the wafers is outside an allowable range of temperatures. In response to determining that the wafer state data is outside of the allowable range, the fault classification unit 130 selects a subset of a plurality of faults based on the received sensor tool trace data. For example, the received sensor tool trace data may indicate that the fault is associated with a gas inlet and so the fault classification unit 130 would choose a subset of faults known to be associated with the gas inlet. The false classification device 130 then selects at least one fault from the subset of the plurality of faults based on the wafer state data, as will be discussed in detail below.

In one alternative embodiment, the fault classification unit 130 may determine that the received sensor tool trace data is indicative of a fault. For example, the fault classification device 130 may compare the received sensor tool trace data to a library of signatures that are associated with known faults. In response to determining that that the received sensor tool trace data is indicative of a fault, the fault classification unit 130 selects a subset of a plurality of faults based on the received wafer state data. For example, the received wafer state data is outside of an allowable range and that this indicates that the fault is associated with an increased critical dimension and so the fault classification unit 130 would choose a subset of faults known to be associated with the increased critical dimensions. The false classification device 130 then selects at least one fault from the subset of the plurality of faults based on the sensor tool trace data using any desirable selection or matching technique.

By using both the sensor tool trace data and the wafer state data to identify and/or classify potential faults, the fault classification unit 130 may be able to identify and/or classify potential faults more efficiently and/or accurately than conventional techniques, which detect and/or classify potential faults based only on sensor tool trace data. The fault classification unit 130 may also be able to identify and/or classify potential faults more efficiently and/or accurately than conventional techniques, which identify and/or classify potential faults based only on wafer state data.

In the interest of clarity, hereinafter the present invention will be described in the context of one embodiment in which the fault classification unit 130 first detects a fault condition by determining that the wafer state data associated with at least one of the wafers is outside of an allowable range. However, persons of ordinary skill in the art having benefit of the present disclosure should appreciate that this is only one exemplary embodiment and is not intended to limit the present invention. In one alternative embodiment, the fault classification unit 130 may first detect the fault condition using sensor tool trace data indicative of a fault, as discussed above.

Figure 2:
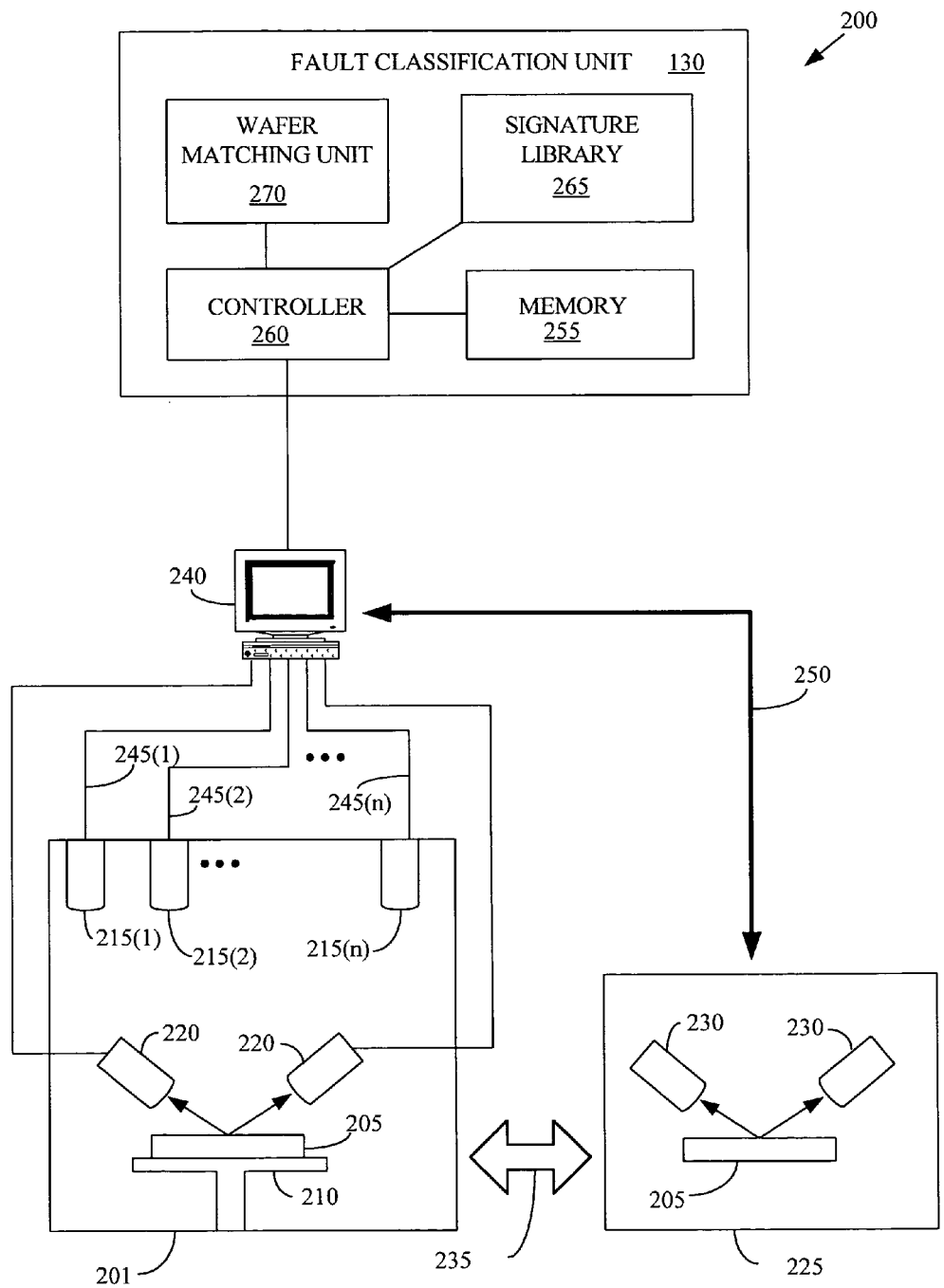
FIG. 2 conceptually illustrates an exemplary embodiment of a portion of a manufacturing system including a processing tool that is communicatively coupled to a fault classification unit.

FIG. 2 conceptually illustrates an exemplary embodiment of a portion of a manufacturing system 200 including a processing tool 201 that is communicatively coupled to the fault classification unit 130. In the illustrated embodiment, the processing tool 201 includes a wafer 205 positioned on a platform or a wafer stage 210. Persons of ordinary skill in the art should appreciate that the processing tool 201 may include other components not shown in FIG. 2. In the interest of clarity, only those components of the processing tool 201 that are relevant to the present invention will be discussed herein.

The processing tool 201 includes a plurality of sensors 215(1-n) for collecting sensor tool trace data. The present invention is not limited to any particular type of sensor 215(1-n). In various alternative embodiments, the sensors 215(1-n) may be any desirable type of sensor or any desirable combination of types of sensors. For example, the sensors 215(1-n) may include thermocouples, pressure sensors, gas flow sensors, radiation sensors, acoustic sensors, and the like. Moreover, the present invention is not limited to any particular number of sensors 215(1-n). In alternative embodiments, the processing tool 201 may include more or fewer sensors 215(1-n) than are shown in FIG. 2. For example, the processing tool 201 may include about 50 sensors 215(1-n). The sensors 215(1-n) may be originally supplied with the processing tool 201 or they may be add-ons.

In one embodiment, the processing tool 201 includes a plurality of wafer metrology devices 220 for collecting in situ wafer state data. The present invention is not limited to any particular type of in situ wafer metrology devices 220. In various alternative embodiments, the in situ wafer metrology devices 220 may be any desirable type of device, or any desirable combination of types of devices, for collecting wafer state data. For example, the in situ wafer metrology devices 220 may include scatterometers, ellipsometers, in situ metrology tools, and the like. Moreover, the present invention is not limited to any particular number of in situ wafer metrology devices 220. In alternative embodiments, the processing tool 201 may include more or fewer in situ wafer metrology devices 220 than are shown in FIG. 2.

In one alternative embodiment, which may be practiced in place of or in addition to embodiments that include one or more in situ wafer metrology devices 220, the manufacturing system 200 includes at least one ex situ, or stand-alone, wafer metrology tool 225. The wafer metrology tool 225 includes a plurality of wafer metrology devices 230 for collecting ex situ wafer state data. The ex situ wafer metrology devices 230 may include scatterometers, ellipsometers, ex situ metrology tools, and the like. Moreover, the present invention is not limited to any particular number of ex situ wafer metrology devices 230. In alternative embodiments, the processing tool 201 may include more or fewer ex situ wafer metrology devices 230 than are shown in FIG. 2.

The wafer 205 may be provided to the processing tool 201 and the ex situ measurement tool 225 in any desirable order. In one embodiment, the wafer 205 is transferred from the processing tool 201 to the ex situ wafer metrology tool 225 substantially after undergoing processing in the processing tool 201, as indicated by the arrow 235. Thus, in this embodiment, at least a portion of the wafer state data may be collected after the sensor tool trace data is collected. In one alternative embodiment, the wafer 205 is transferred from the ex situ wafer metrology tool 225 to the processing tool 201 substantially before undergoing processing in the processing tool 201, in which case at least a portion of the wafer state data may be collected before the sensor tool trace data is collected.

The sensors 215(1-n), the in situ wafer metrology devices 220, and the ex situ wafer metrology tool 225, if present, are coupled to an equipment interface 240, such as a computer, by one or more interfaces 245(1-n), 250. Persons of ordinary skill in the art should appreciate that the one or more interfaces 245(1-n), 250 may include components that are not shown in FIG. 2 such as processing units, data communication ports, routers, switches, hubs, cables, wires, connectors, and the like. The equipment interface 240 may be coupled to the fault classification unit 130 in any desirable manner. In one embodiment, the equipment interface 240 is communicatively coupled to the fault classification unit 130 via the network 120 (shown in FIG. 1).

The equipment interface 240 receives sensor tool trace data and wafer state data from the sensors 215(1-n), the in situ wafer metrology devices 220, and/or the ex situ wafer metrology tool 225 and provides the sensor tool trace data and wafer state data to the fault classification unit 130. In one embodiment, the equipment interface 240 provides the sensor tool trace data and wafer state data to the fault classification unit 130 substantially unchanged. However, persons of ordinary skill in the art should appreciate that, in alternative embodiments, the equipment interface 240 may modify the sensor tool trace data and/or the wafer state data before providing this data to the fault classification unit 130. For example, the equipment interface 240 may change the format of the sensor tool trace data and/or the wafer state data. In one embodiment, the sensor tool trace data and/or the wafer state data may be stored in a memory 255 in the fault classification unit 130.

The fault classification unit 130 includes a controller 260. In one embodiment, the controller 260 determines whether the wafer state data is within an allowable range. For example, the controller 260 may determine whether one or more wafer parameters such as a film thickness, a critical dimension, the wafer temperature, and the like are within a predetermined allowable range associated with these parameters. In one embodiment, the controller 260 may receive the allowable range as part of the recipe used by the processing tool 201 to process one or more of the wafers. Alternatively, the controller 260 may determine the allowable range based on one or more empirical relations, such as may be determined by engineers operating the processing tool 201.

Figure 3:
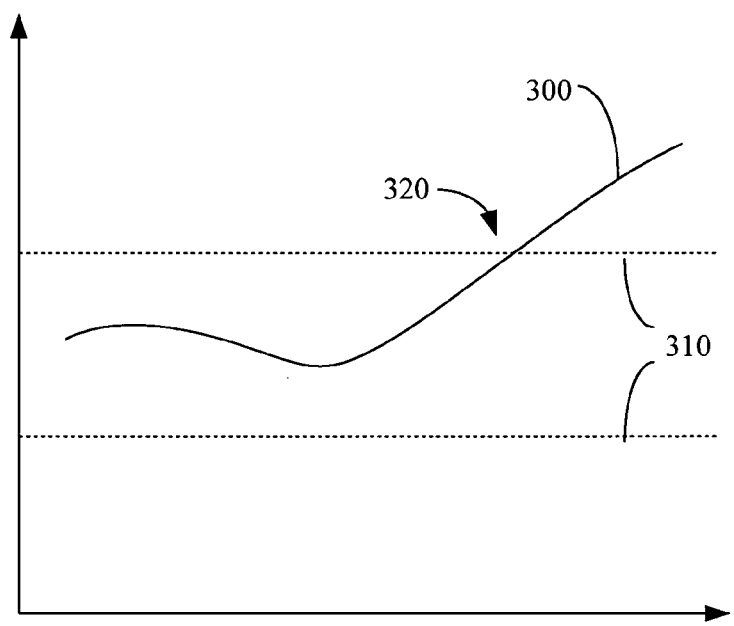
FIG. 3 conceptually illustrates wafer state data that may be collected, in accordance with the present invention.

FIG. 3 conceptually illustrates a wafer state data set 300 that may be accessed by the controller 260. Persons of ordinary skill in the art should appreciate that the wafer state data set 300 may be representative of any desirable parameter associated with one or more wafers. An allowable range for the wafer state data set 300 is indicated by the lines 310. If the wafer state data 300 is within the allowable range, the processing tool 201 and/or the ex situ wafer metrology device 225 may continue to operate normally. However, the controller 260 may determine that wafer state data 300 departs from the allowable range 310 approximately at a location 320. When the controller 260 determines that the wafer state data 300 is not within the allowable range, the controller 260 selects a subset of a plurality of faults based on the sensor tool trace data.

Figure 4:
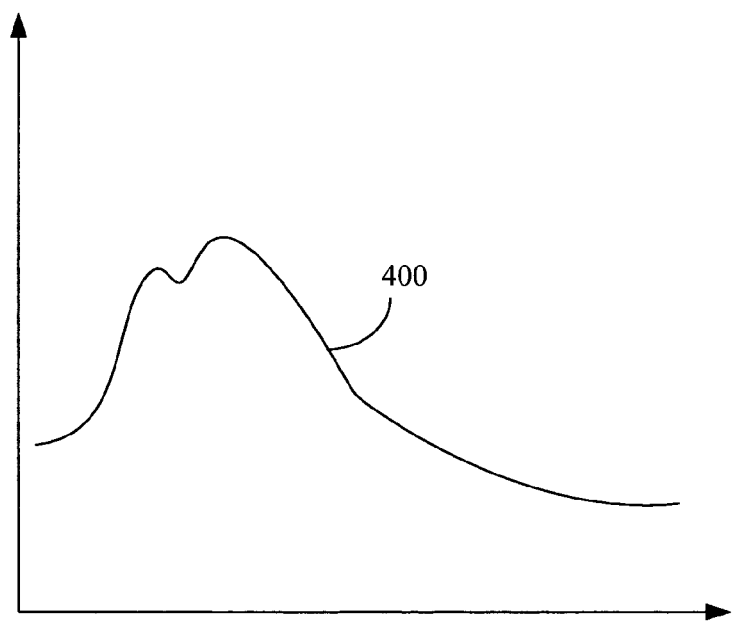
FIG. 4 conceptually illustrates sensor tool trace data that may be collected, in accordance with the present invention.
Figure 5A:
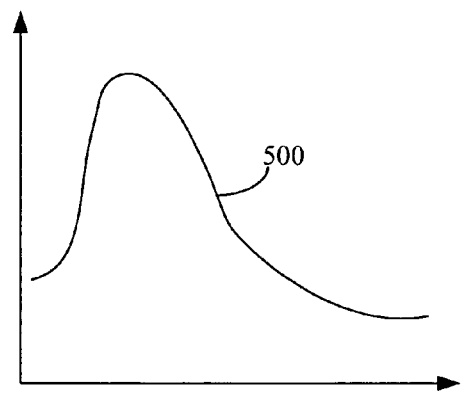
FIGS. 5A, 5B, 5C, and 5D conceptually illustrate sensor tool trace signatures that may be associated with a subset of faults, in accordance with the present invention.
Figure 5B:
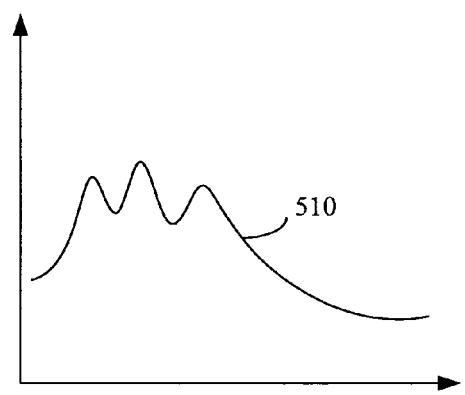
Figure 5C:
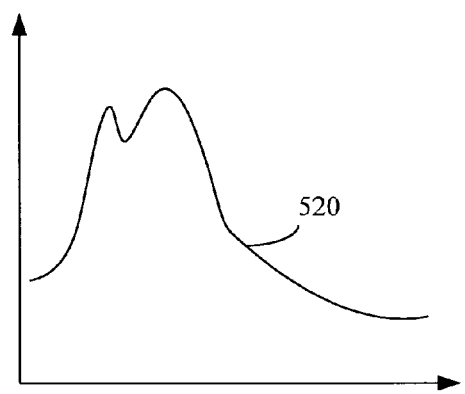
Figure 5D:
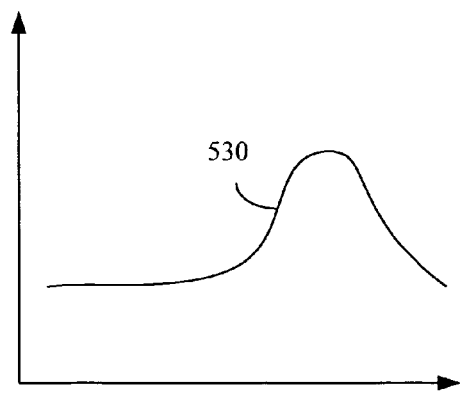

FIG. 4 conceptually illustrates sensor tool trace data 400 that is accessed in response to determining that the wafer state data 300 is not within the allowable range and then used to select the subset of the plurality of faults. Persons of ordinary skill in the art should appreciate that the sensor tool trace data 400 may be representative of any desirable parameter(s) associated with one or more sensors and/or tools. In one embodiment, the controller 260 may determine that the out-of-range wafer state data 300 is associated with one or more wafers or wafer lots. The controller 260 may then access the sensor tool trace data 400 that is stored in the memory 255. In one embodiment, the controller 260 determines a time window associated with the time at which the out-of-range wafer state data 300 was collected and accesses the sensor tool trace data 400 that was collected within the time window. The time window may be coincident with the time at which the out-of-range wafer state data was collected, as well as extending to times substantially before and substantially after the time at which the out-of-range wafer state data was collected.

The controller 260 may compare the sensor tool trace data 400 to other tool trace signatures that are associated with various faults. For example, the controller 260 may compare the sensor tool trace data 400 to historical tool trace signatures that have been associated with various faults. These associations may be determined using empirical relationships, such as may be developed by engineers using the processing tool 201. However, persons of ordinary skill in the art should appreciate that the present invention is not limited to any particular association between a tool trace signature and one or more faults, or any particular technique for establishing these relationships.

FIGS. 5A, 5B, 5C, and 5D conceptually illustrate tool trace signatures 500, 510, 520, 530 respectively that are associated with one or more faults. For example, the tool trace signature 500 may be associated with a valve failure in a gas inlet, the tool trace signature 510 may be associated with a leak in the gas inlet, the tool trace signature 520 may be associated with a clog in the gas inlet, and the tool trace signature 530 may be associated with an open outlet valve. The controller 260 selects a subset of faults based upon the sensor tool trace data 400 and the tool trace signatures 500, 510, 520, 530 accessed by the controller 260. In one embodiment, the controller 260 compares the sensor tool trace data 400 with tool trace signatures 500, 510, 520, 530 stored in a signature library 265. The controller 260 determines the subset of the tool trace signatures 500, 510, 520, 530 (and the corresponding subset of the plurality of faults) that has the closest match to the sensor tool trace data 400 using the accessed signatures and the associated subsets of a plurality of faults. For example, the controller 260 may determine that the sensor tool trace data 400 is a close match to the tool trace signatures 500, 510, 520. The controller 260 may also determine that the sensor tool trace data 400 is not a close match to the tool trace signature 530. Numerous univariate and multivariate techniques for matching the sensor tool trace data to the closest signature associated with the subsets of faults are well known to those of ordinary skill in the art, so they are not described in greater detail herein. For example, a least squares error technique may be employed.

The controller 260 then selects at least one fault from the selected subset of faults based upon the wafer state data 300. In one embodiment, the controller provides the wafer state data 300 and the selected tool trace signatures 500, 510, 520 associated with the subset of faults to a wafer matching unit 270, which may match the wafer state data 300 to a fault in the subset of faults. For example, the wafer matching unit 270 may compare the wafer state data 300 to historical wafer state data associated with the selected tool trace signatures 500, 510, 520 and/or the faults in the selected subset of faults. Alternatively, the wafer matching unit 270 may compare the wafer state data to a model of the wafer state data associated with the faults in the selected subset of faults. Parameters of the model of the wafer state data may be determined in any desirable manner, including being determined empirically. Specific methods for matching the wafer state data to the historical wafer state data and/or the model of the wafer state data are well known and, in the interest of clarity, will not be discussed further herein.

Figure 6A:
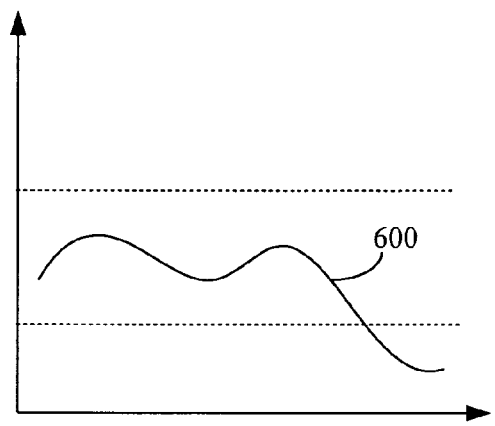
FIGS. 6A, 6B, and 6C conceptually illustrate exemplary a subset of wafer state data sets that may be associated with faults in the subset of faults, in accordance with the present invention.
Figure 6B:
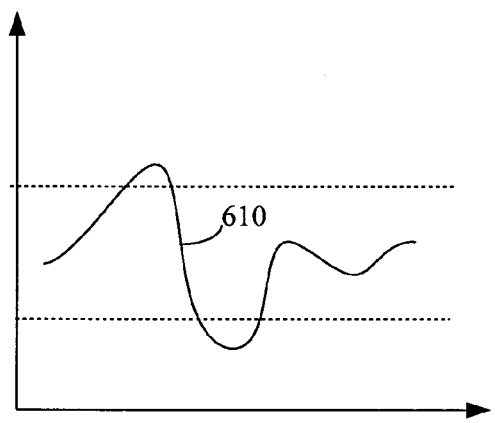
Figure 6C:
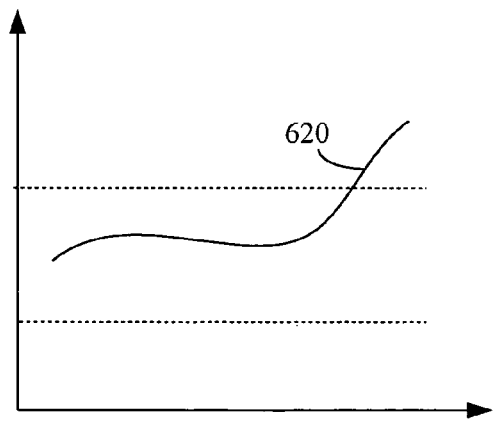

FIGS. 6A, 6B, and 6C conceptually illustrate historical wafer state data sets 600, 610, 620 that are associated with the tool trace signatures 500, 510, 520, respectively, and/or the faults in the associated subset of faults. In one embodiment, the controller 260 compares the wafer state data set 300 to the historical wafer state data sets 600, 610, 620. The controller 260 may determine that the wafer state data set 300 is most closely matched by the historical wafer state data set 620. Accordingly, the controller may then determine that the fault indicated by the wafer state data set 300 being outside the allowable range 310 is the same as the fault associated with the historical wafer state data sets 620 and the tool trace signature 520, i.e. the clog in the gas inlet.

In various alternative embodiments, the controller 260, the signature library 265, and the wafer matching unit 270 may be implemented in software, hardware, or any desirable combination thereof. For example, the controller 260 may include a processing device configured to execute software-encoded scripts for selecting the subset of the plurality of faults. For another example, the signature library 265 may include a storage device for storing data in a database. For yet another example, the wafer matching unit 270 may include a processing device configured to execute software-encoded scripts for comparing wafer state data with historical wafer state data and/or a model of the wafer state data.

Figure 7:
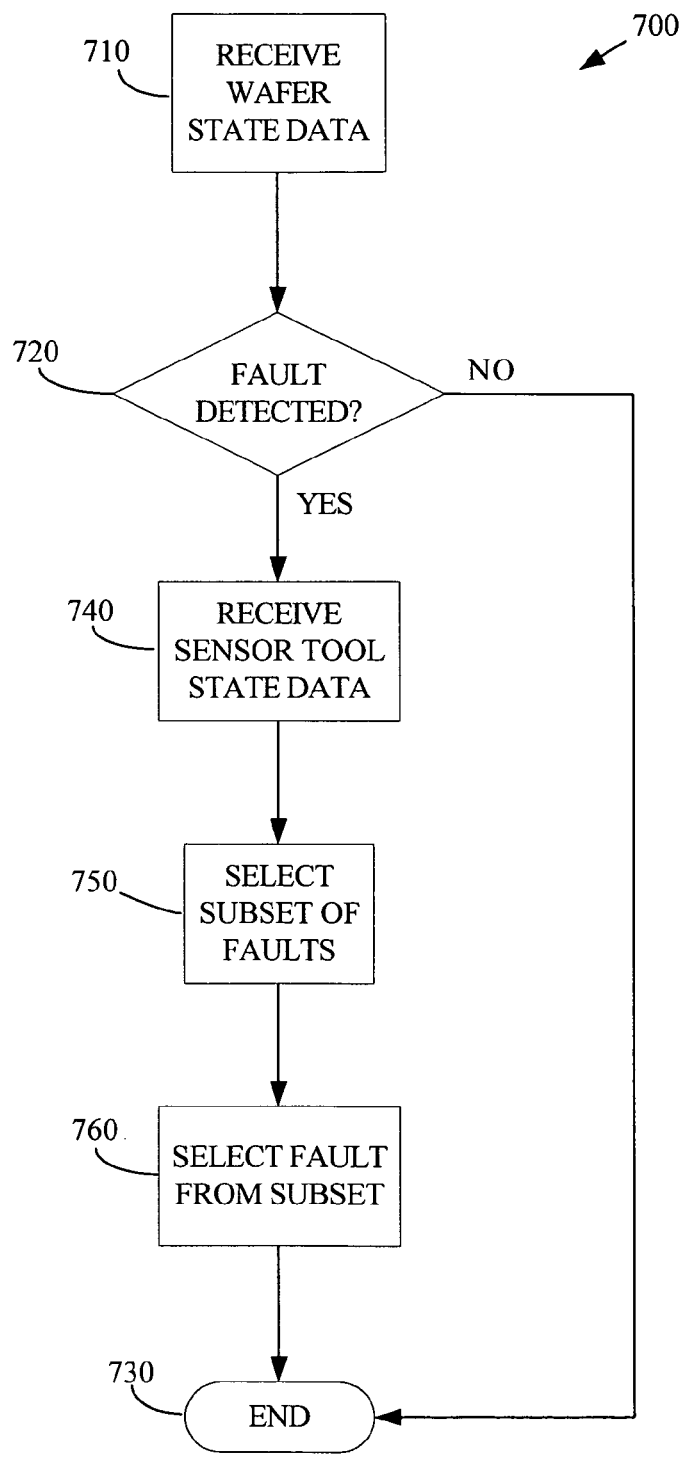
FIG. 7 conceptually illustrates an exemplary embodiment of a method of classifying a fault using sensor tool trace data and wafer state data.

FIG. 7 conceptually illustrates an exemplary embodiment of a method 700 of classifying a fault using sensor tool trace data and wafer state data. In the exemplary embodiment, wafer state data is accessed (at 710) and analyzed to detect (at 720) one or more faults based on the received wafer state data, as discussed in detail above. If no potential fault is detected (at 720), the method 700 ends (at 730). However, if a potential fault is detected (at 720) based on the received wafer state data, sensor tool state data is accessed (at 740). In the illustrated embodiment, the sensor tool state data is accessed (at 740) after the potential fault is detected (at 720). However, the present invention is not limited to accessing (at 740) the sensor tool state data after the potential fault has been detected (at 720). In alternative embodiments, the sensor tool state data may be accessed (at 740) before the potential fault is detected (at 720).

A subset of a plurality of faults is selected (at 750) using the sensor tool state data and then one or more faults are selected (at 760) from the subset using the wafer state data, as discussed in detail above. In one embodiment, a single fault is selected (at 760) from the subset. However, in alternative embodiments, more than one fault may be selected (at 760) from the subset. For example, a matching technique used to select (at 760) the fault from the subset may determine that more than one fault in the subset is approximately equally well matched by the wafer state data, in which case more than one fault may be selected (at 760). The method 700 ends (at 730).

The particular embodiments disclosed above are illustrative only, as the invention may be modified and practiced in different but equivalent manners apparent to those skilled in the art having the benefit of the teachings herein. Further more, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method, comprising:

accessing wafer state data associated with at least one wafer processed by at least one processing tool and sensor tool trace data associated with the at least one processing tool;

determining that at least one fault occurred based upon at least one of the wafer state data and the sensor tool trace data;

selecting, in response to determining that the at least one fault occurred, a subset of a plurality of faults based upon at least one of the wafer state data and the sensor tool trace data; and selecting at least one fault from the subset of the plurality of faults based upon at least one of the wafer state data and the sensor tool trace data.

2. The method of claim 1, wherein determining that the at least one fault occurred based upon at least one of the wafer state data and the sensor tool trace data comprises determining whether the wafer state data is within an allowable range.

3. The method of claim 2, wherein selecting the subset of a plurality of faults comprises selecting the subset of the plurality of faults based on the sensor tool trace data.

4. The method of claim 3, wherein selecting the at least one fault from the subset of the plurality of faults comprises selecting the at least one fault from the subset of the plurality of faults based on the wafer state data.

5. The method of claim 1, wherein determining that the at least one fault occurred based upon at least one of the wafer state data and the sensor tool trace data comprises determining that the at least one fault occurred based upon sensor tool trace data indicative of at least one fault.

6. The method of claim 5, wherein selecting the subset of a plurality of faults comprises selecting the subset of the plurality of faults based on the wafer state data.

7. The method of claim 6, wherein selecting the at least one fault from the subset of the plurality of faults comprises selecting the at least one fault from the subset of the plurality of faults based on the sensor tool trace data.

* * * * *